(12) United States Patent
Borchers et al.

(10) Patent No.: US 9,065,996 B2
(45) Date of Patent: Jun. 23, 2015

(54) SURVEILLANCE SYSTEM

(75) Inventors: Klaus Borchers, Otterbach (DE); Ralf Hubrich, Ramstein-Meisenbach (DE)

(73) Assignee: Mobotix AG, Kaiserslautern (DE)

( * ) Notice: Subject to any disclaimer, the term of this patent is extended or adjusted under 35 U.S.C. 154(b) by 1039 days.

(21) Appl. No.: 12/531,185

(22) PCT Filed: Mar. 14, 2008

(86) PCT No.: PCT/DE2008/000432
§ 371 (c)(1),
(2), (4) Date: Feb. 24, 2010

(87) PCT Pub. No.: WO2008/110158
PCT Pub. Date: Sep. 18, 2008

(65) Prior Publication Data
US 2010/0141733 A1   Jun. 10, 2010

(30) Foreign Application Priority Data
Mar. 15, 2007   (DE) .................. 10 2007 013 239

(51) Int. Cl.
| | |
|---|---|
| *H04N 7/18* | (2006.01) |
| *H04N 5/225* | (2006.01) |
| *H04N 5/232* | (2006.01) |
| *H04N 19/46* | (2014.01) |
| *H04N 19/91* | (2014.01) |
| *H04N 19/60* | (2014.01) |
| *H04N 19/85* | (2014.01) |

(52) U.S. Cl.
CPC .............. *H04N 5/2259* (2013.01); *H04N 5/232* (2013.01); *H04N 5/23238* (2013.01); *H04N 7/183* (2013.01); *H04N 19/46* (2014.11); *H04N 19/91* (2014.11); *H04N 19/60* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 5,185,667 A * | 2/1993 | Zimmermann | 348/143 |
| 6,675,386 B1 | 1/2004 | Hendricks et al. | |
| 7,071,968 B2 | 7/2006 | Novak | |
| 7,283,309 B2 * | 10/2007 | Caldwell et al. | 359/676 |
| 2005/0007478 A1 * | 1/2005 | Ahiska | 348/335 |
| 2005/0162531 A1 * | 7/2005 | Hsu et al. | 348/207.1 |
| 2006/0187305 A1 | 8/2006 | Trivedi et al. | |

FOREIGN PATENT DOCUMENTS

| | | |
|---|---|---|
| JP | 2000-324474 | 11/2000 |
| JP | 2001-285844 | 10/2001 |
| JP | 2004-064539 | 2/2004 |
| WO | 03/056516 | 7/2003 |
| WO | 2007/060497 | 5/2007 |

\* cited by examiner

*Primary Examiner* — Thomas Dailey
*Assistant Examiner* — Nam Tran

(57) ABSTRACT

The invention relates to a surveillance system having an image recording means for recording optically distorted images and having a transmission means for transmission of image information from the image recording means to a reproduction means which reproduces, in an undistorted form, image details of the images which have been recorded with optical distortion. In this connection, it is provided that the transmission means is designed for detail transmission of distorted images and for joint transmission of additional information, which allows image detail distortion to be corrected, in order to allow distortion correction in the reproduction means.

23 Claims, 1 Drawing Sheet

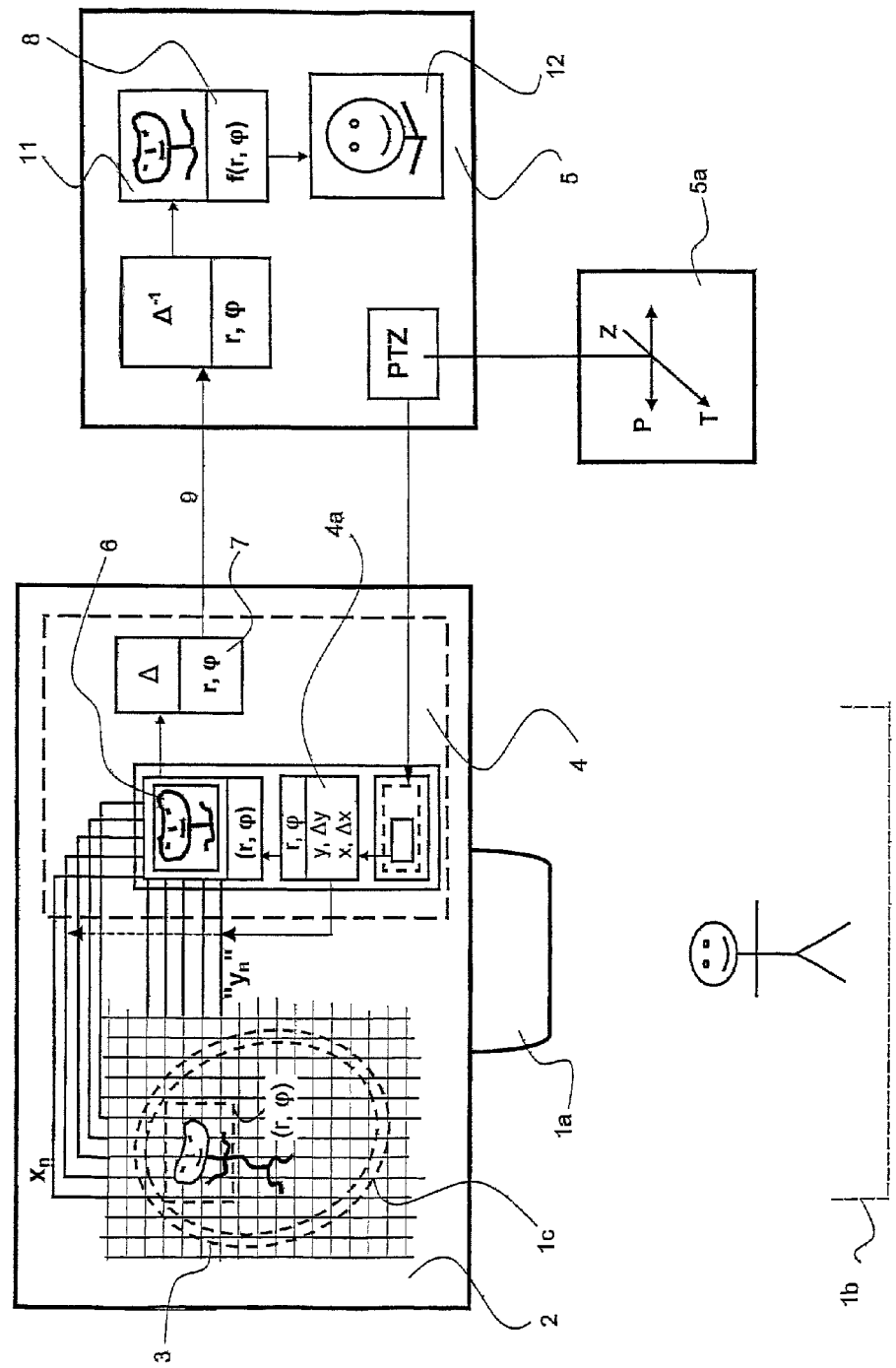

US 9,065,996 B2

SURVEILLANCE SYSTEM

CROSS-REFERENCE TO RELATED APPLICATION

This application is related to and claims the benefit under 35 U.S.C. §119 and 35 U.S.C. §365 of International Application No. PCT/DE2008/000432, filed Mar. 14, 2008, the disclosure of which is hereby explicitly incorporated by reference herein.

The present invention relates to what is claimed in the precharacterizing clause and therefore deals with the surveillance of specific areas by means of cameras.

Nowadays, surveillance cameras are used to a relatively major extent. In this case, it is generally desirable to keep the number of cameras which must be used for surveillance of specific areas as small as possible. In this case, the surveillance should equally well often be able to cover large spatial areas, and high-resolution images of specific critical areas must also be available. Airports or train stations may be mentioned here by way of example, where large-area surveillance is required, but it must then be possible to record individual persons, whom the surveillance service consider to be suspicious, with sufficiently high resolution that, for example, it is possible to recognize and possibly identify the face. Comparable situations also occur in other typical public spaces such as department stores and the like.

First of all, it has been proposed that surveillance systems be equipped with cameras which can be tilted and panned in order to look in a specific direction and at the same time have a zoom in order to allow the area which is being looked at to be recorded with greater resolution. However, this means that a camera must be equipped with motors for tilt and zoom control, which makes the systems heavy, expensive and unreliable.

It has therefore already been proposed to use a high-resolution image sensor and to use this to record a very large area by means of a wide-angle or fish-eye objective. The high resolution of the image sensors used in this case makes it possible to pan in the recorded image and to enlarge details digitally. The typical panning, tilt and zoom movement of a camera, which are normally referred to as PTZ control (pan, tilt and zoom control) has accordingly already been implemented in software in the prior art.

However, in this case, one initial problem is that wide-angle objectives, in particular fish-eye objectives, produce highly distorted images. However, in principle, with the known geometry of optical distortion, it is possible to correct the distortion. The appropriate algorithms are known.

It is also known from the prior art for the image recorded in a distorted form to be transmitted to a control center. The software PTZ image area selection can then be carried out in the control center, and distortion correction can be carried out if the lens geometry is known. However, this has the disadvantage that very large amounts of data have to be processed, thus requiring suitable transmission and computation complexity. It has already been proposed that only the distorted details be transmitted, in order to avoid this problem. However, distortion correction is no longer possible in this case. Particularly bearing in mind the fact that the details are transmitted in order to allow identification of details, this is, however, extremely unsatisfactory, particularly in the image edge areas.

It would be desirable to specify a surveillance system in which surveillance is possible with little effort.

The object of the present invention is to provide something novel for industrial use.

The achievement of this object is claimed in an independent form. Preferred embodiments can be found in the dependent claims.

Thus, first of all, the invention proposes a surveillance system having an image recording means for recording optically distorted images and having a transmission means for transmission of image information from the image recording means to a reproduction means which reproduces, in an undistorted form, image details of the images which have been recorded with optical distortion, wherein the invention provides that the transmission means is designed for detail transmission of distorted images and for joint transmission of additional information, which allows image detail distortion to be corrected, in order to allow distortion correction in the reproduction means.

One major discovery can therefore be considered to be that there is no longer any need to completely correct the distortion of an image in a camera in order for this image then to be transmitted completely; in fact, it is possible to allow distortion correction to be carried out remotely from the camera, or the image recording means, with only a small amount of additional transmission complexity, beyond the information of an image detail to be transmitted.

On the one hand, this makes it possible to equip the camera with considerably less computation power. Furthermore, it is possible to considerably reduce the transmission rate or the bandwidth required for transmission.

This therefore in its own right results overall in an energy saving in many cases, because distortion correction is a computation-intensive, and therefore energy-intensive, process, and images or image details are often recorded from surveillance cameras only for documentation, without needing to be viewed permanently. Since images which have not undergone distortion correction can thus be passed on without any disadvantages and these distortion-uncorrected images can once again be deleted, in the normal way, without any particular incident, this makes it possible to save a not inconsiderable amount of computation complexity while at the same time ensuring that image distortion can nevertheless be corrected if required, by means of the jointly transmitted additional information, which allows image detail distortion correction.

In one particularly preferred variant, the image recording means will have an addressable image sensor, that is to say an image sensor in which individual pixels or individual pixel groups can be addressed separately. This allows addressing without temporary storage. It is preferable for the image sensor to be addressable such that the pixels can be addressed or read line-by-line and column-by-column. It is particularly preferable to use complimentary metal-oxide semiconductor (CMOS) sensors. As is evident from the above, the image recording means preferably records the optically distorted images digitally.

In one typical application, the distortion will be caused by the use of very strong wide-angle objectives; by way of example, wide-angle objectives with a viewing angle of more than 45° are typical, and viewing angles of even more than 60° can increasingly also be used well. The advantages are evident to an even greater extent in the case of angles of 90° or more, particularly in the case of wide-angle objectives with a viewing angle of more than 160°; wide-angle objectives such as these are typically referred to as "fish-eye objectives". The invention is particularly preferable for major distortion, such as that which occurs beyond about 90°. The usefulness with fish-eye objectives is therefore of particular importance, because they can be used for surveillance of very large areas with only a few cameras. Since the overall effort for analysis of image details is low because the transmission only of details which is made possible in the present case, and, when required, also distortion correction only of details, it is furthermore possible to use a very high resolution image sensor without this more than proportionately increasing the computation load or transmission load. The invention is accordingly obviously particularly preferable for particularly high resolution images. The use of sensors with more than 1, 2, and particularly preferably more than 3 Megapixels, should therefore be mentioned.

The image recording means is also suitable for repeated recording of moving images, in particular at an image repetition frequency which is sufficient to identify movements. This is preferred.

The transmission means itself will transmit the image information via a channel whose bandwidth is typically limited, that is to say a channel on which the transmission of data is restricted, either because of cost considerations and/or to allow communication as well between other appliances than just the control center and an image recording means that is currently being considered. The use of limited-bandwidth channels and in particular transmission channels in radio networks, such as local area network (LAN), wireless local area network (WLAN), BLUETOOTH, universal mobile telecommunications system (UMTS), global system for mobile communications (GSM) should be mentioned in particular.

Surprisingly, compressed image information can be transmitted without any problems. Even if only parts of an image are transmitted, these parts can be compressed for transmission, using compression methods which are known per se, and the distortion of the image data to be decoded on the reproduction means, that is to say the decompressed image data, can then be corrected.

It should be noted that it is possible to temporarily store the transmitted image information before it is reproduced. The image information can be stored either with or without the distortion having been corrected. Storage in a non-distortion-corrected form is preferable, together with the additional information which allows image detail distortion correction. On the other hand, it is possible to carry out distortion correction before storage and then to display the image data whose distortion has been corrected, although this is not worthwhile for mere documentation purposes. The capability to store completely transmitted, distorted total images instead of subsections and the joint storage of jointly transmitted information which is required for distortion correction are intended to be explicitly covered within the scope of the invention.

In one preferred variant, bidirectional communication is made possible via the transmission means, thus in particular making it possible to transmit control information to the image recording means. In addition to details relating to the physical camera operation, such as presetting a shutter or an image repetition frequency, the control information may also and in particular comprise the information which is required to define one or more desired image details; in particular, it is possible to define PTZ parameters which originate from a virtual pan of the view in the overall image and zooming into and out of a scene that is being recorded completely. In one preferred operating mode of the surveillance system according to the invention, reproduction means can therefore be used to define the PTZ parameters or parts thereof. In this case, at least one parameter from the group pan comprising angle, tilt angle and zoom factor is or are preferably defined. This can be done by movement of a cursor, which is moved by means of a mouse or joystick, on a large image, or else for example by keyboard commands, in which case information relating to a next desired image detail is then transmitted to the image recording means via the transmission means.

Particularly in the case of geometry distortion, which is known in reproduction means, from the PTZ parameters, it is possible to define the xy addresses of a sensor area to be read from the image recording means directly. The xy addresses of the sensor area can be defined in an absolute form if the sensor size is known in the reproduction means; in particular, otherwise, it is also possible without any problems to define relative coordinates, for example "17% left, 23% down" in order to preset a desired detail or detail start.

Alternatively and/or additionally, a desired image detail is defined on the image recording means on the basis of the transmitted parameters and, in the case of CMOS image sensors for example, this can be done by determining a specific line and column area which corresponds to the current pan and tilt parameters, and by the pixels being resolved with respect to selected zoom parameter by possible combination of individual pixels to form pixel areas, in order then to transmit corresponding image data to a control center, together with information relating to which lines and columns this information relates to. The information relating to the transmitted lines and columns may, for example, be transmitted by stating the first and last transmitted column and the first and last transmitted line; alternatively, it is also possible, for example, to transmit a first column and a first line together with the width of the column area to be transmitted and the width of the row area to be transmitted. Reference is made to the existence of further alternatives.

Alternatively, it would be possible to provide an indication from which it is possible to determine how far the area center is away from a coordinate origin, such as the sensor center or a sensor corner point. All such details can be used to derive where the image detail is located in the overall image. In addition, it is also possible for the reproduction means to send appropriate requirement commands to the image recording means.

Distortion correction can then be carried out by reference to possibly camera-specific geometry correction data which is provided, for example stored, in the reproduction means. In this context, it should be noted that it is possible to transmit the information which is required for distortion correction from the image recording means to a reproduction means repeatedly, in particular periodically or once, for example for initialization. Such transmission of information which is required for distortion correction can also be carried out when a new image record file is stored. In this case, it is possible to also store the information in a file header or the like. This makes it possible to carry out dedicated distortion correction for different image recording means. The calibration data for a given image recording means can in this case preferably first of all be stored in the image recording means. When fish-eye objectives are used for this purpose, which create different distortion from one camera to another because of manufacturing tolerances, this nevertheless allows respectively appropriate distortion correction in a reproduction control center.

As mentioned, it is also possible to use the present invention when the images to be transmitted, whose distortion has not yet been corrected, are intended to be compressed. Image compression can be carried out in various ways. By way of example, compression of an individual image independently of information contained in subsequent or previous images, may be mentioned. Tiled compression in accordance with the JPEG Standard should also be mentioned. Alternatively and/or additionally, it is possible to refer to previous and/or, in particular for temporary storage of images, subsequent images, in order to avoid having to completely transmit all the pixels or compressed pixels for each image, and instead of this to make the major aspect the transmission of differences between successive images.

It should be mentioned in particular that coding is possible, in the same way as in previous applications from the same applicant (the previously described compression methods from the same applicant have in the meantime been introduced as MxPEG coding).

It is also preferable for the transmission means to be able to transmit a plurality of image details simultaneously from one and the same image recording means. It is evident that in cases such as these, considerable advantages can likewise be obtained from the present invention, and each individual image detail can be transmitted using the procedure described above. In this case, it should be noted that it is possible, if required, to transmit calibration information, which is required for distortion correction, only once from the image recording means for both image detail streams.

The invention will be described only by way of example in the following text with reference to the drawing, in which:

FIG. 1 shows a surveillance system according to the present invention.

FIG. 1 shows a surveillance system 1, which is annotated in general 1, an image recording means 2 for recording of optically distorted images, cf. reference number 3, in this case represented by the highly distorted image of a person, and a transmission means 4 for transmission of image information from the image recording means to an image reproduction means 5, which reproduces in an undistorted form image details of the images that have been recorded with optical distortion, with the transmission means 4 being designed for the transmission of details of distorted images, cf. reference number 6, and for joint transmission of additional information 7 which allows image detail distortion correction, in order to allow the distortion correction in the reproduction means 5, cf. reference number 8.

In the present case, the surveillance system 1 is formed with a single camera which has a fish-eye objective $1a$ with a viewing angle of close to 180°, which transmits an image of an area $1b$ to be monitored to a CMOS sensor $1c$, which can be read completely or partially line-by-line, cf. reference sign $y_n$, and column-by-column, cf. reference sign $x_n$ in FIG. 1.

The system comprising a fish-eye objective $1a$ and a CMOS sensor $1c$ creates a distortion in a manner known per se. The distortion created by this system can be calibrated and is assumed to be known, and the invention is based on the premise that algorithms $f(r, \phi)$ are known, by means of which an image on the CMOS sensor can have its distortion corrected, provided that the position of the image points whose distortion is to be corrected is known relative to a center point of the CMOS sensor. In the present case, it is assumed that, for example, distortion correction is carried out by use of polar coordinates $r, \phi$. Other parameters may, of course, be used for distortion correction algorithms.

The image recording means 2 can carry out surveillance over a large area and, for example, may be used as part of a complex surveillance system, as is normal practice in a place of detention or the like.

The CMOS sensor $1c$ has high resolution, that is to say it has a resolution of a plurality of Megapixels, which makes it possible to also search for details, for example a face, in some areas of the overall image.

An image detail which is intended to be examined in a dedicated manner can be preselected from the reproduction means 5 via a control means $5a$ by receiving at the image recording means 2 a pan, tilt and zoom parameter which can be preselected on the image reproduction means 5, for example by means of a mouse control or keyboard control. The PTZ parameter is used in the transmission means 4 of the image recording means 2 to define an image detail $x_n \ldots x_{(n+\Delta)}$ and $y_{(n+\Delta)}$, that is to say this defines which columns and lines of the CMOS sensor must be read in order to produce a specific pan/tilt/zoom parameter set from the CMOS sensor. This address definition stage $4a$ in the transmission means 4 at the same time defines how a given corner, in this case the right-hand lower corner, of a desired image detail is located relative to the center of the sensor. The physical sensor center or, if different, the optical sensor center, possibly defined separately for each camera, can be used as the center. In the case of extreme fish-eye objectives, it is particularly worthwhile using the optical center, that is to say an area in which a lens center point beam is imaged. By way of example, this is made possible in this case by defining parameters $r, \phi$ of this corner, which indicate the polar coordinates relative to the sensor center.

The transmission means 4 is then designed to read data from the CMOS sensor at the specific address, that is to say from the calculated lines and columns, and to define a corresponding image detail. This image detail is itself distorted corresponding to the optical distortion, as is illustrated on the face. The image data to be transmitted is collated for transmission with the parameters $r, \phi$ on the basis of which distortion correction can be carried out using the distortion correction function $f(r, \phi)$, which is known in the reproduction means, cf. stage 8.

The image data and the additional information which allows distortion correction are compressed in a compression stage 7, and are then transmitted via a line 9 to the reproduction means 5. A decoding apparatus for decompression of the coded data is provided in the reproduction means 5, as well as a distortion correction stage 11 in which the image 11, which has been recorded with distortion, can have its distortion corrected using the known distortion correction function $f(r, \phi)$ and the transmitted parameters $r, \phi$. The image data whose distortion has been corrected can be displayed on a monitor 12.

As is evident from the above, the surveillance apparatus according to the present invention can be used to record high-resolution images in the image recording means 2, and selected image details can then be transmitted by the transmission means 4, together with the distortion-correction-relevant information, possibly in compressed form, cf. stage 7, thus not loading a transmission channel 9 with wide transmission bandwidths. Since only a small amount of information need be transmitted to correct the distortion of the image details which have been recorded with distortion, whilst the reproduction means knows the distortion correction function $f(r, \phi)$, this therefore makes it possible to considerably reduce the computation load in the image recording means 2 and to reduce the transmission bandwidth on the channel 9, even though a user can control a desired detail, via the controller $5a$, without any problems by preselection of PTZ parameters.

It should be mentioned that it is possible, if required, to carry out a further selection by zooming in and/or panning in a recorded image detail data stream, in which case it is then also possible to correct the distortion in the image of the image details by reference to the distortion correction information.

It should be mentioned that it is not just necessary to transmit exactly the instantaneously actually minimum-desired detail, but a larger detail can be transmitted, as a result of which a detail which is expected with respect to the currently desired detail is obtained and/or stored. Distortion correction according to the invention is also possible in this case.

The invention claimed is:

1. Surveillance system, comprising:
an image recording means for recording: moving, optically distorted, digital, wide angle images comprising a plurality of pixels,
a transmission means for transmitting image information from the image recording means to a reproduction means, said reproduction means reproducing the optically distorted images in a manner correcting distortion,
the transmission means comprising:
means for storing geometrical distortion correction information,
the transmission means further comprising means for repeated transmission of geometrical distortion correction information and being adapted to receive a pan, tilt, zoom target parameter, to determine at least one region of interest according to the pan, tilt parameters; and to combine pixels depending on the zoom parameter;
the transmission means being further adapted to provide an image stream based on the at least one region of interest for a differentially compressed transmission and to transmit the image stream together with an additional information allowing for geometrical distortion correction of the at least one region of interest to the reproduction means, so as to allow a distortion correction of the at least one region of interest in the reproduction means using a geometrical distortion correction and the additional information.

2. The surveillance system as claimed in claim 1, characterized in that the image recording means has an addressable image sensor, comprising an image recording sensor which can be addressed line-by-line and/or row-by-row, in particular a complimentary metal-oxide semiconductor sensor.

3. The surveillance system as claimed in claim 2, characterized in that the image recording means is for digital recording of optically distorted images.

4. The surveillance system as claimed in claim 2, characterized in that the image recording means is equipped with at least one wide-angle objective, in particular with a viewing angle of more than 90°, in particular a fish-eye objective.

5. The surveillance system as claimed in claim 1, characterized in that the image recording means is equipped with at least one wide-angle objective, in particular with a viewing angle of more than 90°, in particular a fish-eye objective.

6. The surveillance system as claimed in claim 1, characterized in that the image recording means is for repeated recording of moving images, in particular with an image repetition frequency of ≥1 Hz.

7. The surveillance system as claimed in claim 6, wherein the image repetition frequency is ≥5 Hz.

8. The surveillance system as claimed in claim 6, wherein the image repetition frequency is ≥10 Hz.

9. The surveillance system as claimed in claim 1, characterized in that the image recording means is equipped with at least 1 megapixels for digital recording of high-resolution images.

10. The surveillance system as claimed in claim 1, characterized in that the transmission means is for transmission of image information via a limited-bandwidth channel, in particular local area network, wireless local area network or by one of the following radio signals: BLUETOOTH, universal mobile telecommunications system and global system for mobile communications.

11. The surveillance system as claimed in claim 1, characterized in that the transmission means is for transmission of compressed image information from the image recording means.

12. The surveillance system as claimed in claim 1, characterized in that the reproduction means is provided with a monitor, in particular a computer monitor in a control center.

13. The surveillance system as claimed in claim 12, wherein the control center comprises a control center for monitoring of images from more than one image recording means.

14. The surveillance system as claimed in claim 1, characterized in that the means for storing is further for storage and/or protection of the transmitted image information and of the additional information which allows image detail distortion to be corrected, or for storage of images whose distortion has been corrected is provided between the transmission means and the reproduction means.

15. The surveillance system as claimed in claim 1, characterized in that characteristic variables which indicate an image detail are transmitted from the reproduction means, the reproduction means comprising a control center, to the image recording means via the transmission means.

16. The surveillance system as claimed in claim 1, characterized in that the transmission means is for compressed transmission of distorted images, in particular differences between compressed image data streams, which differences are obtained by subtraction between successively obtained images.

17. The surveillance system as claimed in claim 1, characterized in that the transmission means is for simultaneous transmission of a plurality of image details from one and the same image recording means.

18. The surveillance system as claimed in claim 1, characterized in that the transmission means is for joint transmission of variables which characterize the position of the image detail in the overall image.

19. The surveillance system as claimed in claim 1, characterized in that the transmission means is for transmission of image details in the form of sectors, and/or rectangular image details.

20. The surveillance system as claimed in claim 1, further comprising a driver.

21. The surveillance system as claimed in claim 1, wherein the image recording means is equipped with at least 2 megapixels for digital recording of high-resolution images.

22. The surveillance system as claimed in claim 1, wherein the image recording means is equipped with at least 3 megapixels for digital recording of high-resolution images.

23. The surveillance system as claimed in claim 1, wherein the pan, tilt, zoom target parameter is received by the transmission means from the reproduction means.

* * * * *